(12) United States Patent
Nakamura et al.

(10) Patent No.: US 6,289,325 B1
(45) Date of Patent: Sep. 11, 2001

(54) COMPUTER SYSTEM, MESSAGE MONITORING METHOD AND ASSOCIATED MESSAGE TRANSMISSION METHOD

(75) Inventors: Yuichi Nakamura, Yokohama; Gaku Yamamoto, Tokyo; Yoshiaki Mima, Musaashino, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/090,321

(22) Filed: Jun. 4, 1998

(30) Foreign Application Priority Data

Jun. 10, 1997 (JP) ...................................... 9-152400

(51) Int. Cl.[7] .............................. G06F 17/60; H04K 1/00; H04L 9/00
(52) U.S. Cl. ............................... 705/80; 705/26; 705/37; 709/201; 709/202; 709/317
(58) Field of Search ................................ 705/26, 80, 37; 709/317, 201, 202, 313

(56) References Cited

U.S. PATENT DOCUMENTS

| | | | |
|---|---|---|---|
| 5,603,031 | 2/1997 | White et al. ........................ | 709/317 |
| 5,678,041 | * 10/1997 | Baker ........................ | 707/9 |
| 5,887,171 | * 3/1999 | Tada et al. ........................ | 709/317 |
| 5,889,863 | * 3/1999 | Weber ........................ | 380/25 |

FOREIGN PATENT DOCUMENTS

WO 9812881
A * 3/1998 (EP) .

OTHER PUBLICATIONS

Tambe, M., dialog file 6 No. 1982507, Architectures for agents that track other agents in multi–agent worlds, 19, May 1996.*
Barbara Hayes–Roth, An architecture for adaptive intelligent systems, Artificial Intelligence 72(1195), pp 329–365, Jan. 1995.*
H s Nwna and D T Ndumu, An introduction to agent technology, pp 55–67, May 1996.*

* cited by examiner

Primary Examiner—Eric W. Stamber
Assistant Examiner—Raquel Alvarez
(74) Attorney, Agent, or Firm—Douglas W. Cameron, Esq.; Perman & Green, LLP

(57) ABSTRACT

The customer agent 9 transmits a search request 15a to a manager 4, which in turn transmits a search request 15b to a shop agent 5. The shop agent 5 transmits a product information service message 16a to the manager 4. The manager 4 transmits a product information service message 16b to the customer agent 9 and a product information service message 16c to a shop agent 17. Based on the thus monitored product information service message 16c, the shop agent 17 generates an associated information service message 18a and transmits it to the manager 4. The manager 4 then transmits an associated information service message 18b to the customer agent 9.

7 Claims, 17 Drawing Sheets

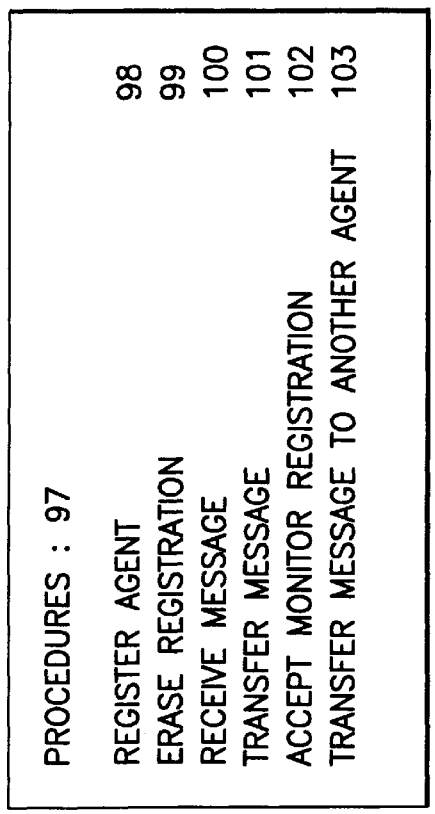

| | |
|---|---|
| DATA : 93 | |
| CUSTOMER LIST | 94 |
| SHOP LIST | 95 |
| MONITOR CONDITION TABLE | 96 |

FIG.8

| | |
|---|---|
| PROCEDURES : 97 | |
| REGISTER AGENT | 98 |
| ERASE REGISTRATION | 99 |
| RECEIVE MESSAGE | 100 |
| TRANSFER MESSAGE | 101 |
| ACCEPT MONITOR REGISTRATION | 102 |
| TRANSFER MESSAGE TO ANOTHER AGENT | 103 |

FIG.9

| | |
|---|---|
| CATEGORY=NOTEBOOK | 104 |
| MAKER=SHARP | 105 |
| BRAND= MebiusNote | 106 |
| NAME= Mebius/Note 7350 | 107 |
| MODEL=MN-7350 | 108 |
| PRICE=41800 | 109 |
| ID=#0 | 110 |
| CPU= Pentium 150 | 111 |
| MEMORY=32 | 112 |

FIG.10

| | |
|---|---|
| CATEGORY=NOTEBOOK | 113 |
| MAKER=SHARP | 114 |
| PRICE<500000 | 115 |

FIG.11

| | |
|---|---|
| CATEGORY=NOTEBOOK | 116 |
| PRICE<500000 | 117 |

| | |
|---|---|
| CATEGORY = NoteBook | 166 |
| MAKER = IBM | 167 |
| BRAND = ThinkPad | 168 |
| NAME ThinkPad 365X | 169 |
| MODEL = 2625-BJ9 | 170 |
| PRICE = 338000 | 171 |
| ID = #7 | 172 |
| CPU = Pentium 150 | 173 |
| MEMORY = 8 | 174 |

COMPUTER SYSTEM, MESSAGE MONITORING METHOD AND ASSOCIATED MESSAGE TRANSMISSION METHOD

BACKGROUND OF THE INVENTION

1. Field of the Invention

This invention relates to a mobile agent technique, and in particular, to a mechanism for monitoring the interaction between mobile agents in a virtual mall using mobile agents.

2. Description of Related Art

A mobile agent includes program code for executing an operation, and data, such as the results of processing, for representing the condition of the mobile agent. In an agent execution environment provided for a computer connected to a computer network, a mobile agent interacts with another mobile agent by exchanging messages and by performing necessary processing. Further, the mobile agent can move to an execution environment in another computer by itself as needed.

Interaction between mobile agents is effected by the exchange of a message object or by a method call. The conventional interaction between the agents is not disclosed to a third agent, and a mechanism for monitoring the interaction between the other agents by a third agent has not been proposed.

While problems relative to security and privacy may arise from the disclosure of the message contents, some benefits may accrue from opening the interactive transaction process to other agents. Consider, for example, a virtual mall where a seller (shop agent) and a buyer (customer agent) exchange product information. The shop agent has product data, and returns a listing of available products upon the reception of a search request from the customer agent. Conventionally, the messages exchanged during such an interactive process are not disclosed, but if the searching contents for a product to be purchased is disclosed, various agents for interrupting to a simple product search can be implemented. For example, an advertising agent, which is an agent for providing associated information, may introduce to the customer agent products associated with a product searched for. Also, an agent that can provide similar products may transmit a message representing that products are available that are similar to a product searched for, or a statistics agent may monitor the statistics for a product search at a virtual mall and transmit them to a customer agent. The customer agent can then employ such information to acquire more product information and purchase the best product available.

Although a mobile agent is described in detail in, for example, U.S. Pat. No. 5,603,031, issued Feb. 11, 1997, entitled "System and Method For Distributed Computation Based Upon the Movement, Execution, and Interaction of Processes in a Network", by White et al. (Japanese Unexamined Patent Publication No.: Hei 7182174), a process for the disclosure of the contents of messages is not described. A mobile agent according to the above patent and a mobile agent according to the present invention differ in various ways.

OBJECTS AND ADVANTAGES OF THE INVENTION

It is an object and advantage of this invention to provide a mechanism for disclosing an interaction between mobile agents.

Further objects and advantages of this invention will become more apparent from a consideration of the drawings and ensuing description.

SUMMARY OF THE INVENTION

The foregoing and other problems are overcome and the objects of the invention are realized by methods and apparatus in accordance with embodiments of this invention.

To achieve the objects of the present invention, an execution environment for mobile agents is disclosed that includes a monitor mechanism for monitoring a message transmitted by an agent. The monitor mechanism may be operated by a manager agent. The monitor mechanism may be included in the execution environment.

The manager agent receives a message from a source agent of the message and transfers the message to a destination agent. The manager agent relays messages, and transmits messages from a specific agent to agents other than a destination agent.

The manager agent can also perform a registration function in response to receiving a registration message from an agent that has begun its activity in the execution environment. The registration function causes the manager agent to register a source agent of the registration message.

The registration message includes an agent type of the source agent of the registration message. The registration function of the manager agent can perform a registration process in correspondence with the agent type.

In response to receiving a monitor registration message from a registering agent, the manager agent can perform a function for registering the registering agent of the monitor registration message and a condition. The condition is included in the monitor registration message and specifies a condition of messages transmitted from another agent that are to be transmitted to the registering agent that has begun its activity in the execution environment.

This registering function can include means for determining whether the condition in the monitor registration message is already registered in the manager agent, and means for, when the condition is already registered, storing the registering agent in correspondence with the condition.

Upon the reception of a message from a specific agent, the transferring function may search for registered condition by contents of the message. When there exists a condition that matches the contents of the message, the transferring function may transmit the message to a registering source agent of the condition.

The execution environment may be a virtual mall, for example, or may be another type of execution environment. In the virtual mall, agent types are a customer agent and a shop agent.

The present invention will be explained by using a manager agent. The present invention can be designed so that an agent has a device for transmitting a registration message for requesting its registration to the manager agent.

In addition, the agent can include a data storage for storing a condition of messages to be transferred to itself by the manager agent and transmitted by another agent; and a device for transmitting the condition as a monitor registration message to the manager agent.

The agent can further include a device for receiving a message transmitted from another agent; when the received message is a message addressed to a different agent, a device for preparing an associated message that includes contents associated with the received message; and a device for transmitting the associated message to the different agent. This agent is, for example, a shop agent.

The device for preparing the associated message may include a device for checking the contents of a received message and for extracting holding information concerning the contents of the received message; and a device for converting the holding information into the form of a message.

The above described invention can be understood as a processing flow, and can be implemented as a computer program for performing the above described processing. It would be obvious to one having ordinary skill in the art that the computer program can be stored in a storage medium, such as a CD-ROM or a floppy disk.

BRIEF DESCRIPTION OF THE DRAWINGS

The above set forth and other features of the invention are made more apparent in the ensuing Detailed Description of the Invention when read in conjunction with the attached Drawings, wherein:

FIG. 8 is a diagram illustrating in detail the manager agent;

FIG. 9 is a diagram showing a product description example;

FIG. 10 is a diagram showing a product search condition description example;

FIG. 11 is a diagram showing a monitor condition description example;

Identically labeled elements appearing in different ones of the above described figures refer to the same elements but may not be referenced in the description for all figures.

DETAILED DESCRIPTION OF THE INVENTION

Figure 1:
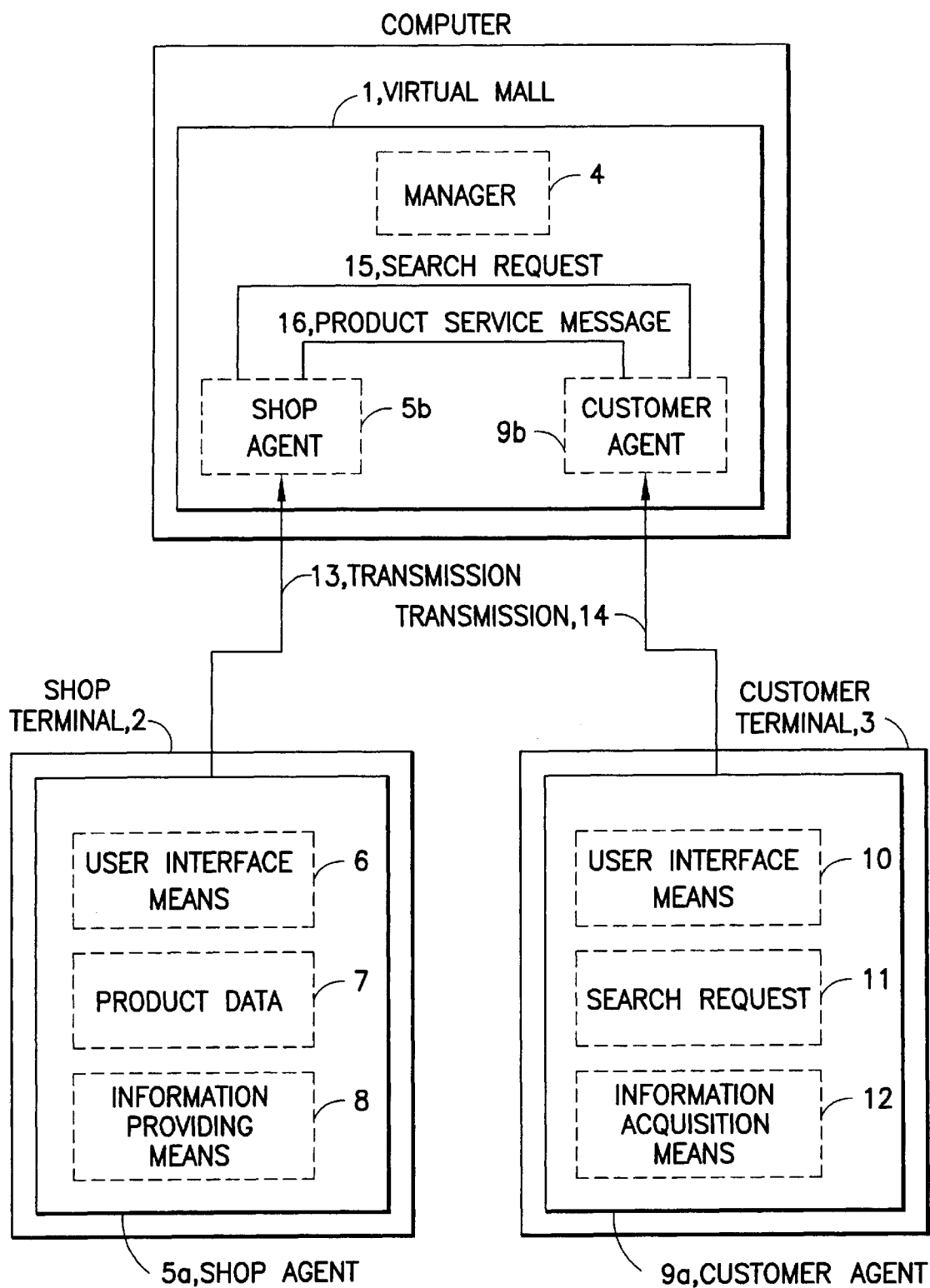
FIG. 1 is a schematic diagram illustrating a virtual mall.

The preferred embodiment of the present invention will now be described referring to the accompanying drawings. FIG. 1 is a block diagram illustrating a virtual mall 1 having a monitor mechanism of the present invention. A shop agent 5a and a customer agent 9a are generated at the respective terminals 2 and 3 and are transmitted to the virtual mall 1 via a network. The virtual mall 1 is an environment in which agents can be active, i.e., an execution environment for agents. A user of an agent understands that a call from his or her agent will be monitored by another agent that then transmits his or her agent to this market. The execution environment of the agent can be constructed from a computer that includes one or more processors, a main memory and storage devices, such a hard disk drive, and can execute various programs. The computer also includes a communication adapter for communicating via a network 3. In FIG. 1, a shop terminal 2 is operated by a shop owner or employee. The shop terminal 2 generates a shop agent 5a. The shop agent 5a includes user interface means 6 for supporting input from a user of product information, product data area 7 for storing product information, and means 8 for providing product information to a customer agent 9a. A customer terminal 3 is operated by a customer. The customer terminal 3 generates the customer agent 9a. The customer agent 9a includes user interface means 10 for inputting specifications for a desired product; a mechanism 11 for holding a search request (search conditions); and information acquisition means 12 for transmitting the search request to the shop agent 5a.

The agents 5b and 9b are the same as the respective agents 5a and 9a and are transmitted to the virtual mall 1 across transmission paths 13 and 14. The virtual mall 1 includes a manager 4 for managing interaction between agents. A message, such as a search request 15 or product service message 16, issued by one agent is transmitted via the manager 4 to another agent. The customer terminal 3 and the shop terminal 2 can be constructed from a conventional computer system, and the generation of agents, and the input to the agents and display of output from the agent to a user are performed by these terminals.

The processing in FIG. 1 will now be explained. First, the shop terminal 2 generates the shop agent 5a, and a user of the shop terminal 2 inputs product information using the user interface means 6. When the input is completed, the product information is held in the product data area 7, and the shop agent 5a is transmitted to the virtual mall 1 across the transmission path 13. Then, the customer terminal 3 generates the customer agent 9a, and a user of the customer terminal 3 inputs search conditions (a search request) 11 using the user interface means 10. The customer agent 9a is transmitted to the virtual mall 1 across the transmission path 14. At the virtual mall 1, a received customer agent 9b generates a message 15 based on the search conditions 11, and transmits it to a shop agent 5b. At this time, the message 15 is first transmitted to the manager 4, which in turn transmits the message 15 to the shop agent 5b. The shop agent 5b extracts the search request 11 from the message 15, and based on this, finds a product that satisfies the condition from the product data area 7 of the agent 5b. The shop agent 5b generates a message 16, including a product list, and transmits it to the customer agent 9b. For this process, the message 16 is first transmitted to the manager 4, which thereafter transmits the message 16 to the customer agent 9b.

Figure 2:
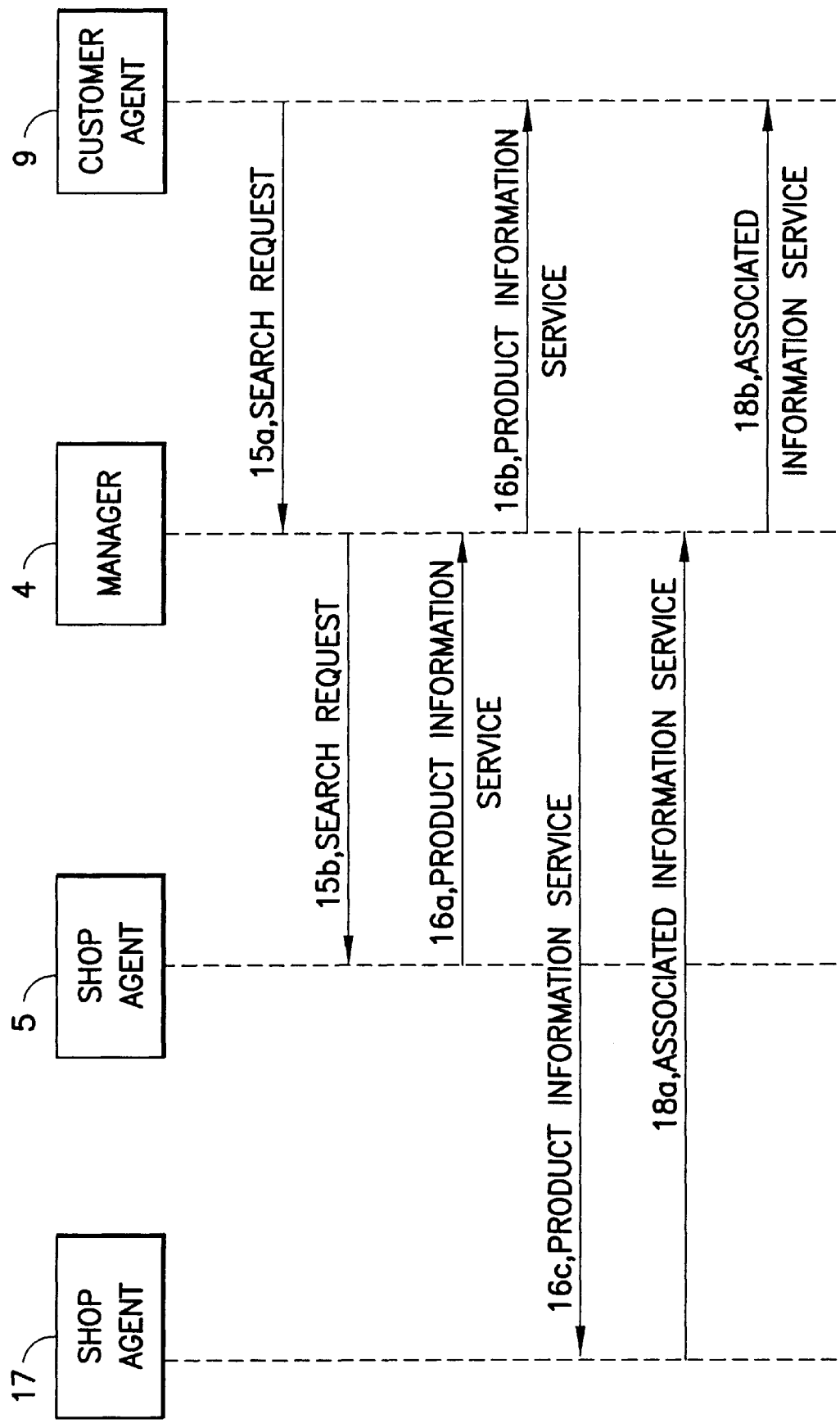
FIG. 2 is a diagram showing a specific interaction example, including monitoring.

FIG. 2 is a diagram showing the processing, during the product search in FIG. 1, that another agent monitors the interactive process and interrupts it. In FIG. 2, a manager 4, a shop agent 5 and a customer agent 9 are the same as those in FIG. 1, while another shop agent 17, which differs from the shop agent 5, monitors the interactive process and issues an interrupt. First, the customer agent 9 transmits a search request 15a to the manager 4. The manager 4 receives the search request 15a and transmits a search request 15b to the shop agent 5. The shop agent 5 receives the search request 15b and transmits a product information service message 16a to the manager 4. The manager 4 receives the product information service message 16a and transmits a product information service message 16b to the customer 9. Additionally, the manager 4 transmits a product information service message 16c to the shop agent 17. In accordance with the thus monitored product information service message 16c, the shop agent 17 generates an associated information service message 18a and transmits it to the manager 4. The manager 4 receives the associated information service message 18a and transmits an associated information service message 18b to the customer agent 9.

Figure 3:
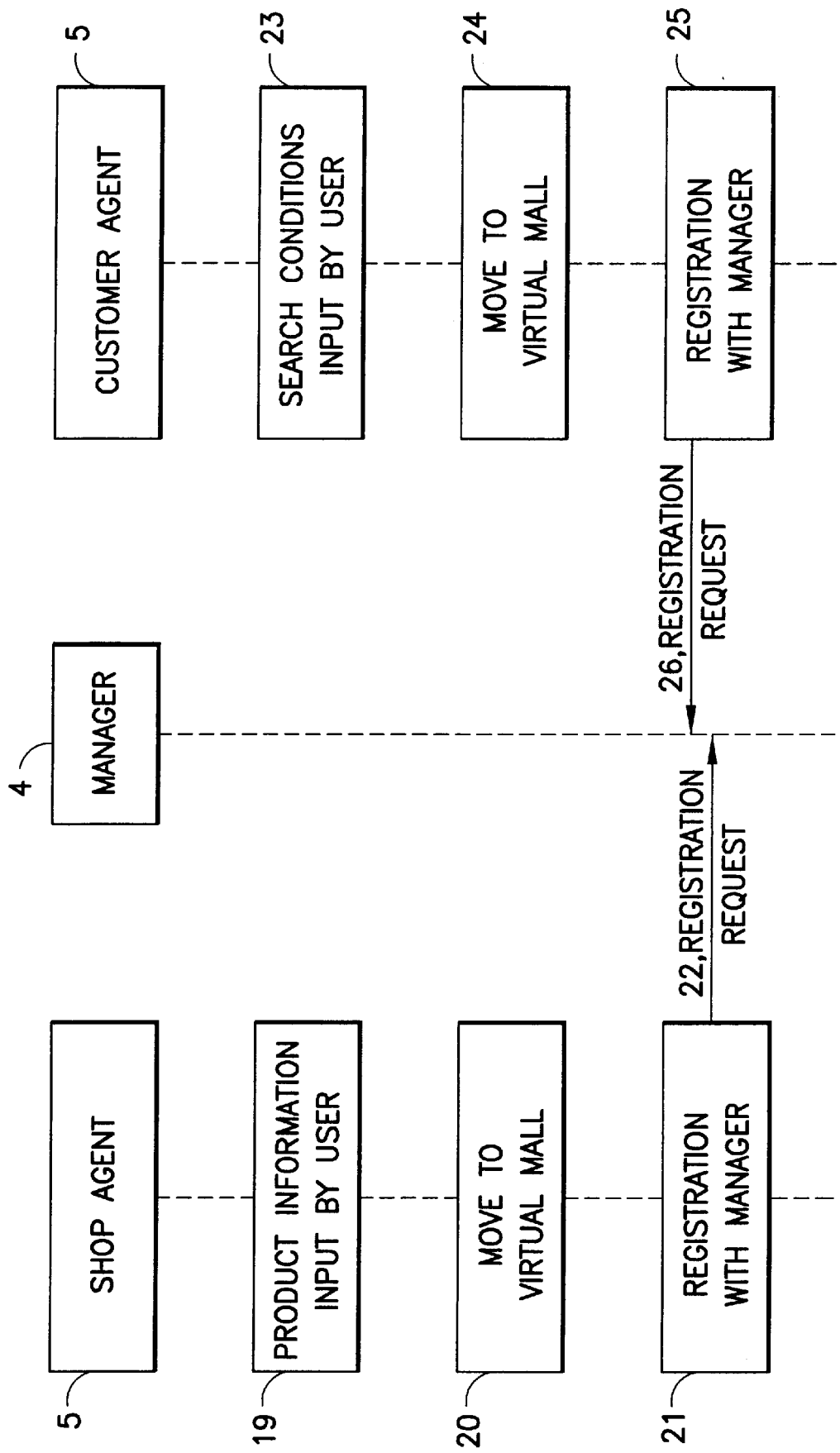
FIG. 3 is a diagram showing the processes for a shop agent, a manager agent and a customer agent.
Figure 4:
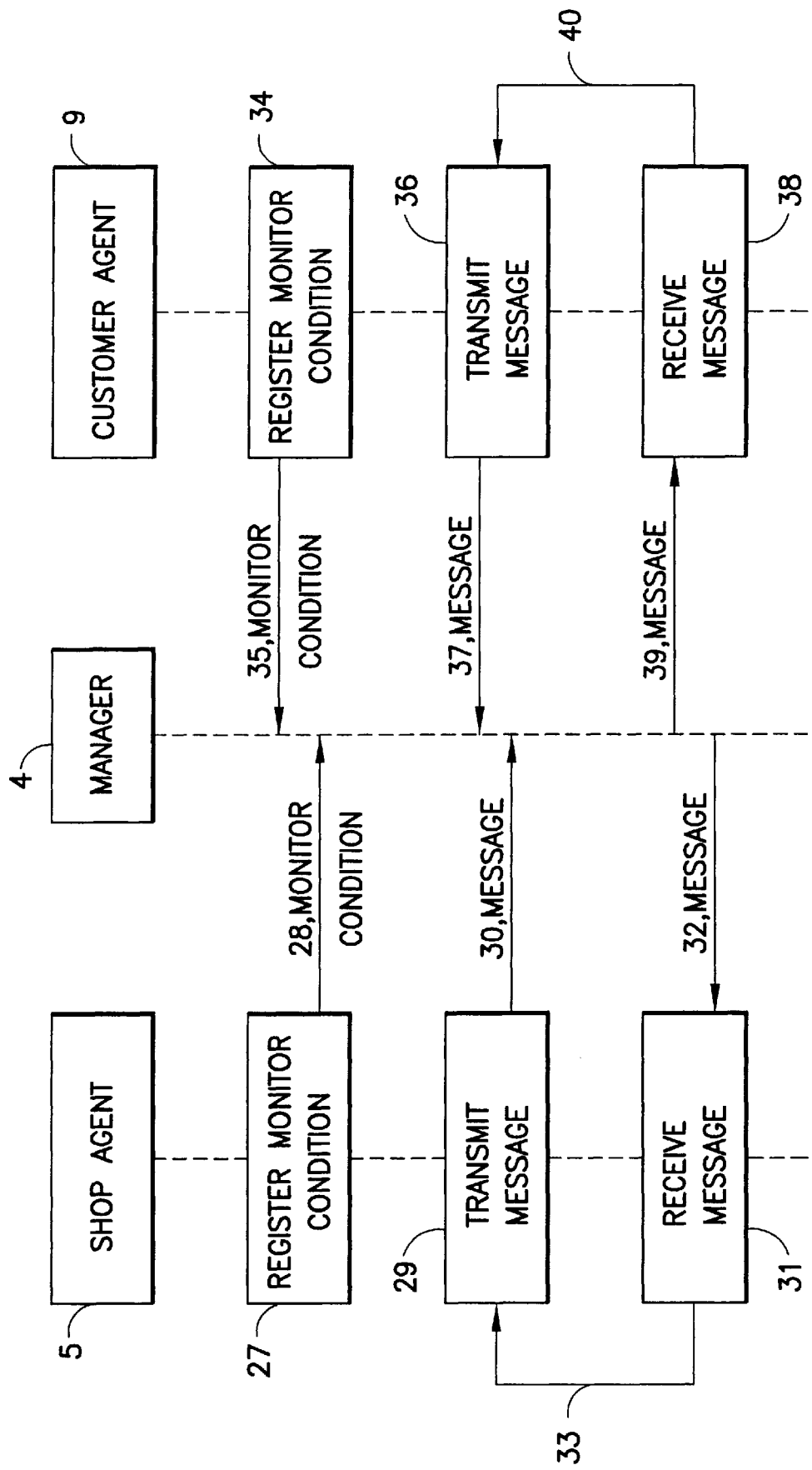
FIG. 4 is a diagram showing the processes for the shop agent, the manager agent and the customer agent.
Figure 5:
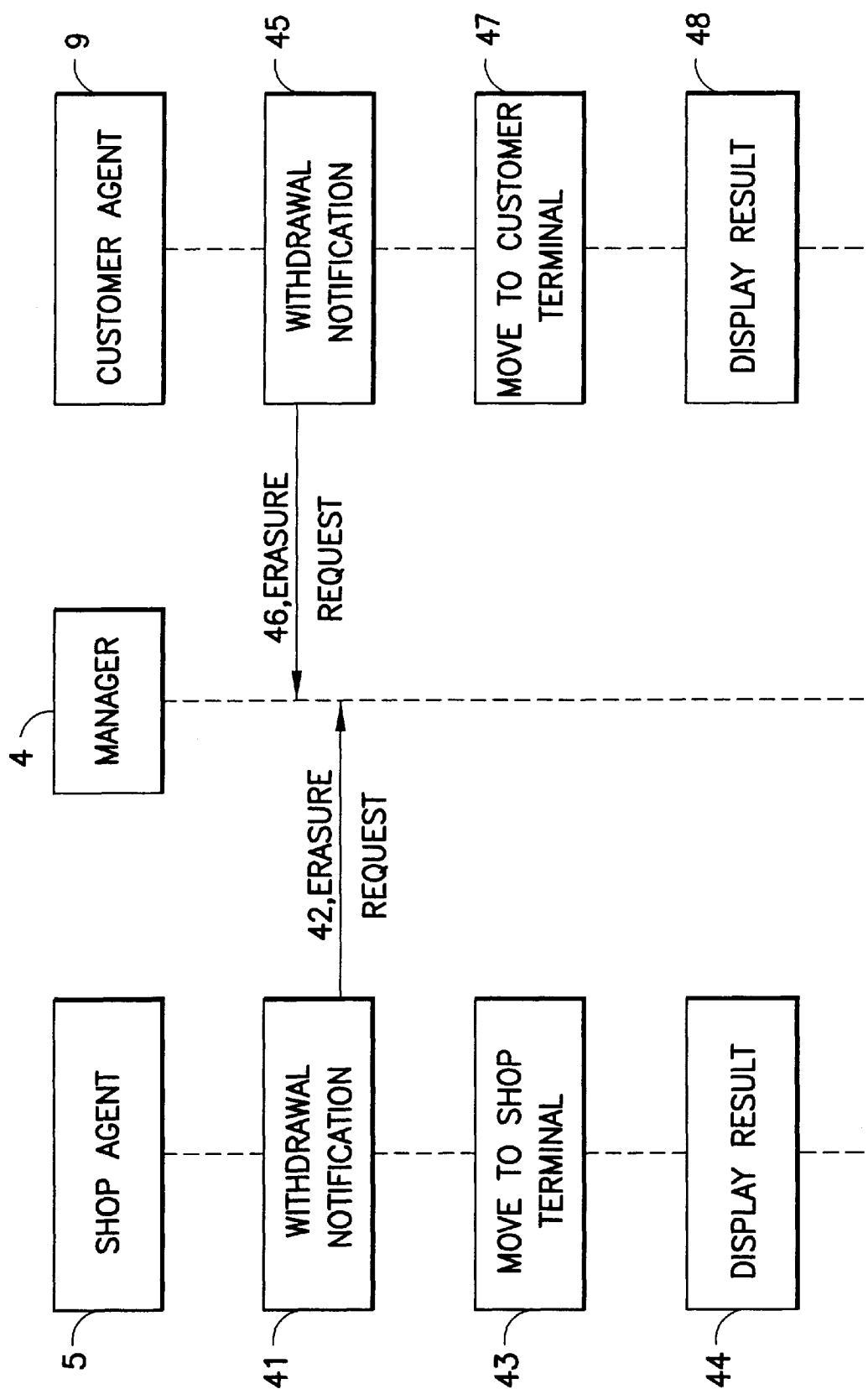
FIG. 5 is a diagram showing the processes for the shop agent, the manager agent and the customer agent.

FIGS. 3, 4 and 5 are diagrams showing the processing performed in the virtual mall 1. As shown in block 5 of FIG. 3, the shop agent 5 is first generated at the shop terminal 2. The shop agent 5 accepts product data input by a user at block 19. The shop agent 5 and the input product data then move, at block 20, to the virtual mall 1. When the shop agent 5 arrives at the virtual mall 1, it initiates, at block 21, registration relative to the manager 4. The manager 4 receives a registration request 22 and registers the shop agent 5. The customer agent 9 is generated at the customer terminal 3. The customer agent 9 accepts search conditions input by the user at block 23, and, with the input search request 24, moves to the virtual mall 1. When the customer agent 9 arrives at the virtual mall 1, it initiates registration relative to the manager 4, at block 25. The manager 4 receives a registration request 26 and registers the customer agent 9.

In FIG. 4, the shop agent 5 performs a registration process at block 27 of a monitor condition. During the registration process a monitor condition message 28 is transmitted to the manager 4. Following this, the shop agent 5 performs, at block 29, a message transmission process to transmit a message 30 to the manager 4. When a message 32 issued by another agent is transmitted by the manager 4, a message reception process at block 31 is performed by the shop agent 5. The message transmission process of block 29 and the message reception process of block 31 are repeated as shown by arrow 33. When the customer agent 9 performs a monitor condition registration process at block 34, a monitor condition 35 is transmitted to the manager 4. Then, the customer agent 9 performs a message transmission process at block 36 to transmit a message 37 to the manager 4. When a message 39 issued by another agent is transmitted by the manager 4, a message reception process at block 38 is performed. The above message transmission process at block 36 and the message reception process at block 38 are repeated as shown by arrow 40.

In FIG. 5, the shop agent 5 performs a withdrawal notification process at block 41 to transmit an erasure request 42 to the manager 4. The shop agent 5 performs a moving process at block 43 to move from the virtual mall 1 to the shop terminal 2. Following this, the shop agent 5 displays, at block 44, the result of the performance at the shop terminal 2. The customer agent 9 performs a withdrawal notification process at block 45 to transmit an erasure request 46 to the manager 4. The customer agent 9 then performs a moving process at block 47 to move from the virtual mall 1 to the customer terminal 3.

The customer agent 9 then displays, at block 48, the result of the performance at the customer terminal 3.

Figure 6:
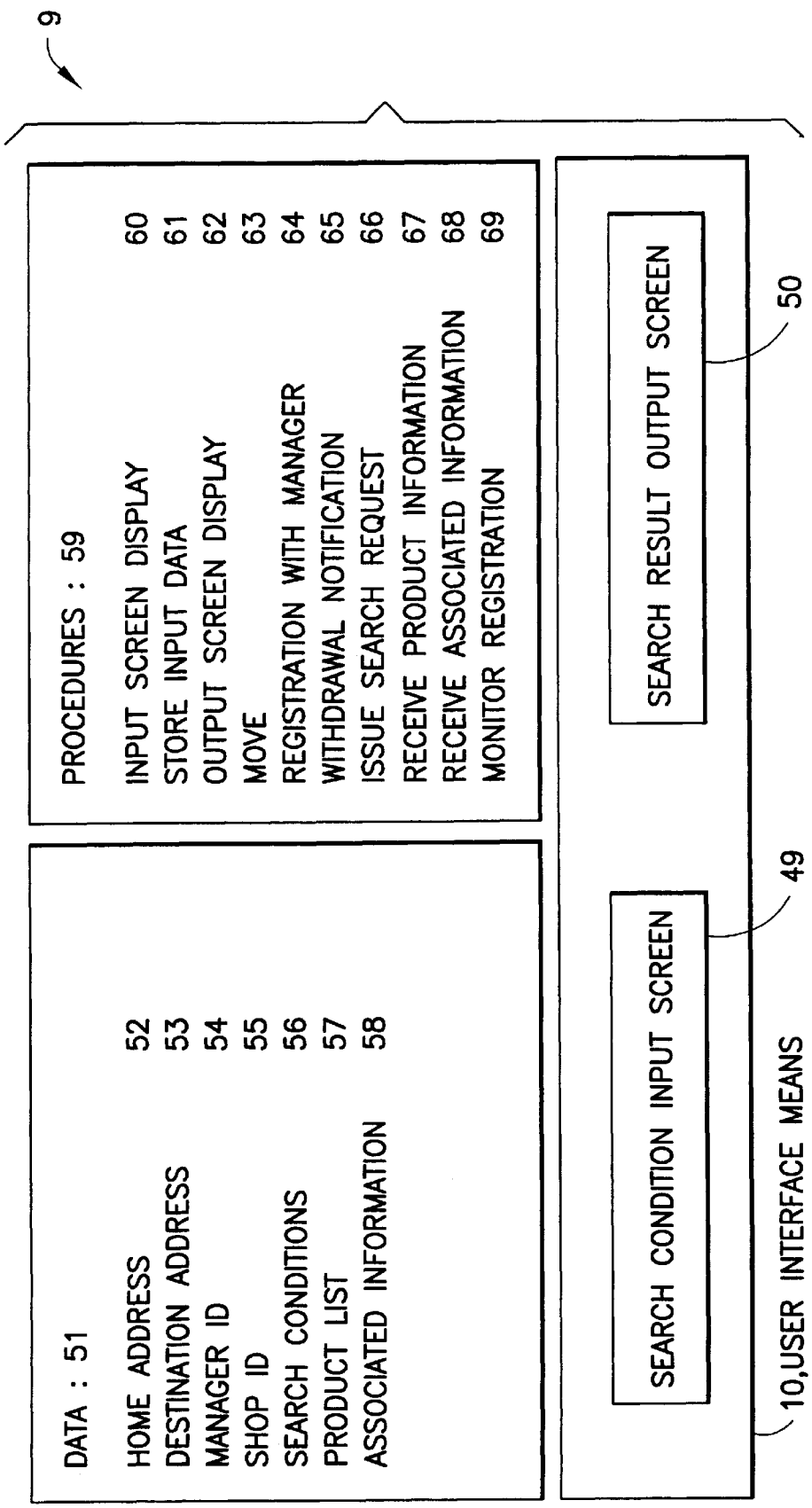
FIG. 6 is a diagram illustrating in detail the customer agent.

FIG. 6 is a diagram illustrating the arrangement of the customer agent 9. In FIG. 6, the customer agent 9 comprises user interface means 10, data 51, and procedures 59. The user interface means 10 includes a search condition input screen 49 to which a customer inputs search conditions, and a search result output screen 50 on which the result of a search is displayed. The data 51 includes a home address 52, which identifies the location at which the agent is generated, i.e., the location of the customer terminal 3; a destination address 53, which identifies the location of the destination virtual mall 1; a manager id 54, which identifies the manager 4; a shop id 55, which identifies a shop agent of which a search is requested; a search condition 56, for holding a search request input by the customer; a product list 57, on which information obtained by the search is stored; and associated information 58, which is information concerning associated products. Not all of the data are necessarily stored, or necessarily employed. The procedures 59 include an input screen display procedure 60 for displaying the search condition input screen 49; an input data storage procedure 61 for storing an input search condition; an output screen display procedure 62 for displaying the search result output screen 50; a moving procedure 63 for moving to another location; a registration procedure 64 in which the customer agent 9 registers itself with the manager 4 as it arrives at the virtual mall 1; a withdrawal notification procedure 65 for notifying the manager 4 of a withdrawal from the virtual mall 1; a search request issuing procedure 66 for transmitting a search request to the manager 4; a product information reception procedure 67 for receiving provided product information; an associated information reception procedure 68 for receiving associated information that is provided; and a monitor registration procedure 69 for registering the contents to be monitored.

Figure 7:
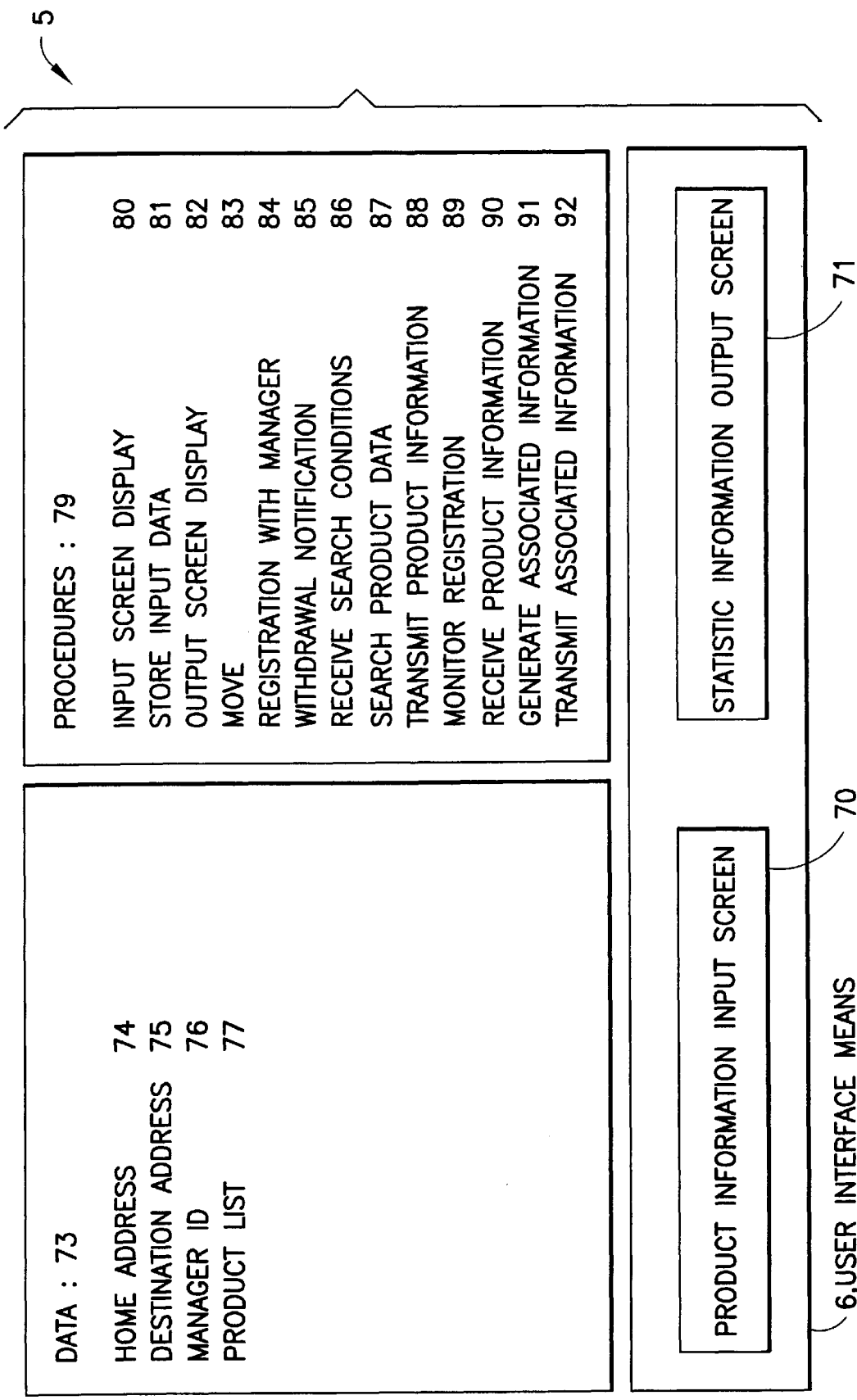
FIG. 7 is a diagram illustrating in detail the shop agent.

FIG. 7 is a diagram illustrating the arrangement of the shop agent 5. In FIG. 7, the shop agent 5 comprises user interface means 6, data 73, and procedures 79. The user interface means 6 includes a product information input screen 70 to which a shop user inputs product information, and a statistic information output screen 71 on which statistic information is displayed. The data 73 include a home address 74, which identifies a location at which an agent is generated, i.e., the location of the shop terminal 2; a destination address 75, which identifies the location of the destination virtual mall 1; a manager id 76, which identifies the manager 4; and a product list 77 on which input product information is stored. Not all of the data are necessarily stored, or necessarily employed. The procedures 79 include an input screen display procedure 80 for displaying the product information input screen 70; an input data storage procedure 81 for storing input product information; an output screen display procedure 82 for displaying the statistic information output screen 71; a moving procedure 83 for moving to another location; a registration procedure 84 in which the shop agent 5 registers itself with the manager 4 when it arrives at the virtual mall 1; a withdrawal notification procedure 85 for notifying the manager 4 of a withdrawal from the virtual mall 1; a search request reception procedure 86 for receiving a search request from the manager 4; a product information search procedure 87 for searching for product information based on the received search condition; a product information transmission procedure 88 for transmitting obtained product information to the manager 4; a monitor registration procedure 89 for registering the contents to be monitored; a product information reception procedure 90 for receiving provided product information; an associated information generation procedure 91 for generating associated information generation procedure 91 for generating associated information based on the received product information; and an associated information transmission procedure 92 for transmitting the associated information to the manager 4.

FIG. 8 is a diagram illustrating the arrangement of the manager 4. The manager 4 includes data 93 and procedures 97. The data 93 includes a customer list 94, which identifies customer agents participating in the virtual mall 1; a shop list 95, which identifies participating shop agents, and a monitor condition table 96, in which are stored monitor conditions registered by the agents. The procedures 97 include an agent registration procedure 98 for registering an agent when it arrives at the virtual mall 1; a registration erasure procedure 99 for erasing an agent when it withdraws from the virtual mall 1; a message reception procedure 100 for receiving a message from an agent; a message transfer procedure 101 for transmitting a received message to a target agent; a monitor registration acceptance procedure 102 for accepting a monitor registration initiated by an agent; and a message transfer procedure 103 for comparing the received message with the monitor condition table 96 and for transferring the message to a third agent when a match is obtained.

FIG. 9 is a diagram of data contained in a product list 77. The product list 77 provides a description of a product of a shop agent. In the example in FIG. 9, the entry CATEGORY=NOTEBOOK 104 specifies a notebook computer as the category; MAKER=SHARP 105 specifies the Sharp Co. as the manufacturer or maker of the notebook computer; BRAND=MebiusNote 106 specifies MebiusNote as the brand name (Mebius is a trademark of Sharp Co.); NAME=MebiusNote 7350 107 provides the product name; MODEL=MN-7350 108 provides the model name; PRICE= 418000 109 specifies the price; ID=#0 110 provides the product id; CPU=Pentium 150 111 indicates a CPU (Pentium is a trademark of Intel Corp.); and MEMORY=32 112 describes the memory size.

FIG. 10 is a diagram illustrating an example internal entry that a customer inputs for a search request, the thus entered request being stored in the search condition 56 of the customer agent 9. CATEGORY=NOTEBOOK 113 specifies the notebook computer as the category; MAKER=SHARP 114 specifies Sharp as the maker; and PRICE<500000 115 specifies 500,000 yen or less as the price.

FIG. 11 is a diagram illustrating an example expression for a monitor condition, the thus expressed monitor condition being registered in the manager 4 by the monitor registration procedure 89 of the shop agent 5 and stored in the monitor table. In FIG. 11, CATEGORY=NOTEBOOK 116 indicates that the category is a notebook computer; and PRICE<500000 117 indicates that a product price is 500,000 yen or less. When the manager 4 receives a message which includes such a content, the manager 4 informs the message of an agent which monitors such a content.

Figure 12:
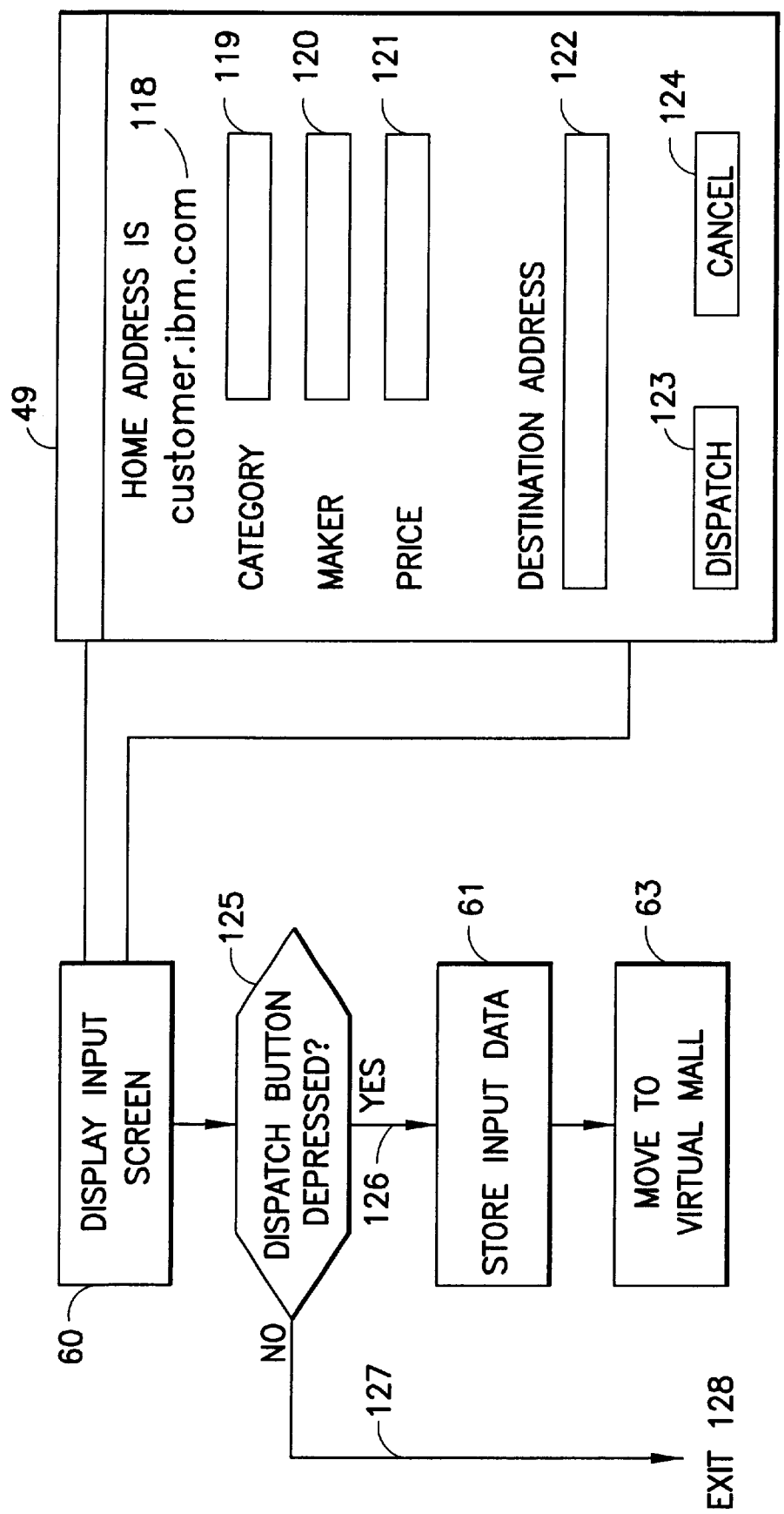
FIG. 12 is a flowchart and diagram showing an example for inputting product search conditions at the customer terminal.

A detailed explanation will now be given of how the data and procedures in the customer agent 9, the shop agent 5 and the manager 4, which are shown in FIGS. 6 through 8, are employed for an exemplary processing. FIG. 12 is a flowchart for the processing performed from the time the customer agent 9 receives a search request from a customer until it moves to the virtual mall 1. The input screen display procedure 60 is performed (block 23 in FIG. 3), and the search condition input screen 49 is displayed. On this screen 49, "Home Address is customer.ibm.com" 118 is the address of the customer terminal 3; CATEGORY 119 is an input field for a product category; MAKER 120 is a maker input field; PRICE 121 is a price input field; DESTINATION ADDRESS 122 is an input field for a destination, i.e., the address of the virtual mall 1; a Dispatch button 123 is a button used to transmit the customer agent 9, based on the input condition, to the virtual mall 1; and a Cancel button 124 is a button to cancel an input. When the dispatch button 123 or the Cancel button 124 is depressed on the screen [49], the program branches in accordance with the depressed button as shown in block 125. When the Dispatch button 123 is depressed a "YES" or y path 126 is followed and the input data storage procedure 61 is called. At block 61 the input data is stored in the search condition area 56 or the destination address area 53 in FIG. 6, and the customer agent 9 moves to the virtual mall 1 at block 63 (block 24 in FIG. 3). When the Cancel button is depressed a "NO" or n path 127 is followed and the processing is terminated at exit 128.

Figure 13:
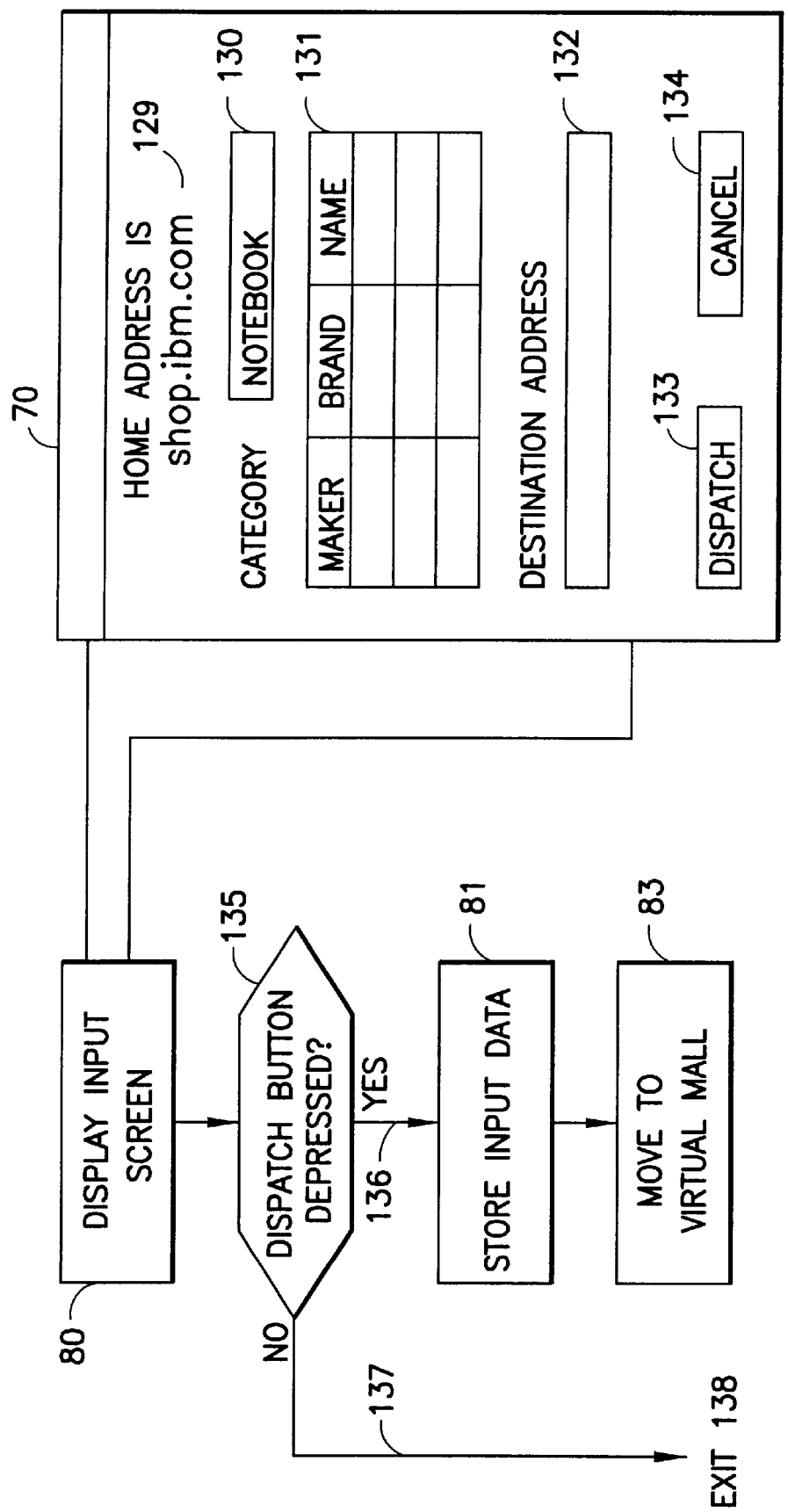
FIG. 13 is a flowchart and diagram showing an example for inputting product information at the shop terminal.

FIG. 13 is a flowchart showing the processing performed from the time the shop agent 5 receives product data input by a shop user until it moves to the virtual mall 1. The input screen display procedure 80 is performed (block 19 in FIG. 3), and the product information input screen 70 is displayed. On this screen 70, "Home Address is shop.ibm.com" 129 is the address of the shop terminal 2; CATEGORY 130 is an input field for a product category; a spread sheet 131 is used to enter product information, with attributes, such as a product maker (MAKER), a brand name (BRAND) and a price (PRICE), being specified; DESTINATION ADDRESS 132 is an input field for a destination, i.e., the address of the virtual mall 1; a Dispatch button 133 is a button used to transmit the shop agent 5 to the virtual mall 1 based on the input information; and a Cancel button 134 is a button to cancel input. When the Dispatch button 133 or the Cancel button 134 is depressed on the screen 70, the program branches, as shown in block 135, in accordance with the depressed button 136. When the Dispatch button 133 is depressed a "YES" or y path 136 is followed and the input data storage procedure 81 is called. The input data is held in the product list 76 and the destination address area 74 in FIG. 7. At block 83 the shop agent 5 moves to the virtual mall 1 (block 20 in FIG. 3). When the Cancel button is depressed a "NO" or N path 137 is followed and the processing is terminated at exit 138.

Figure 14:
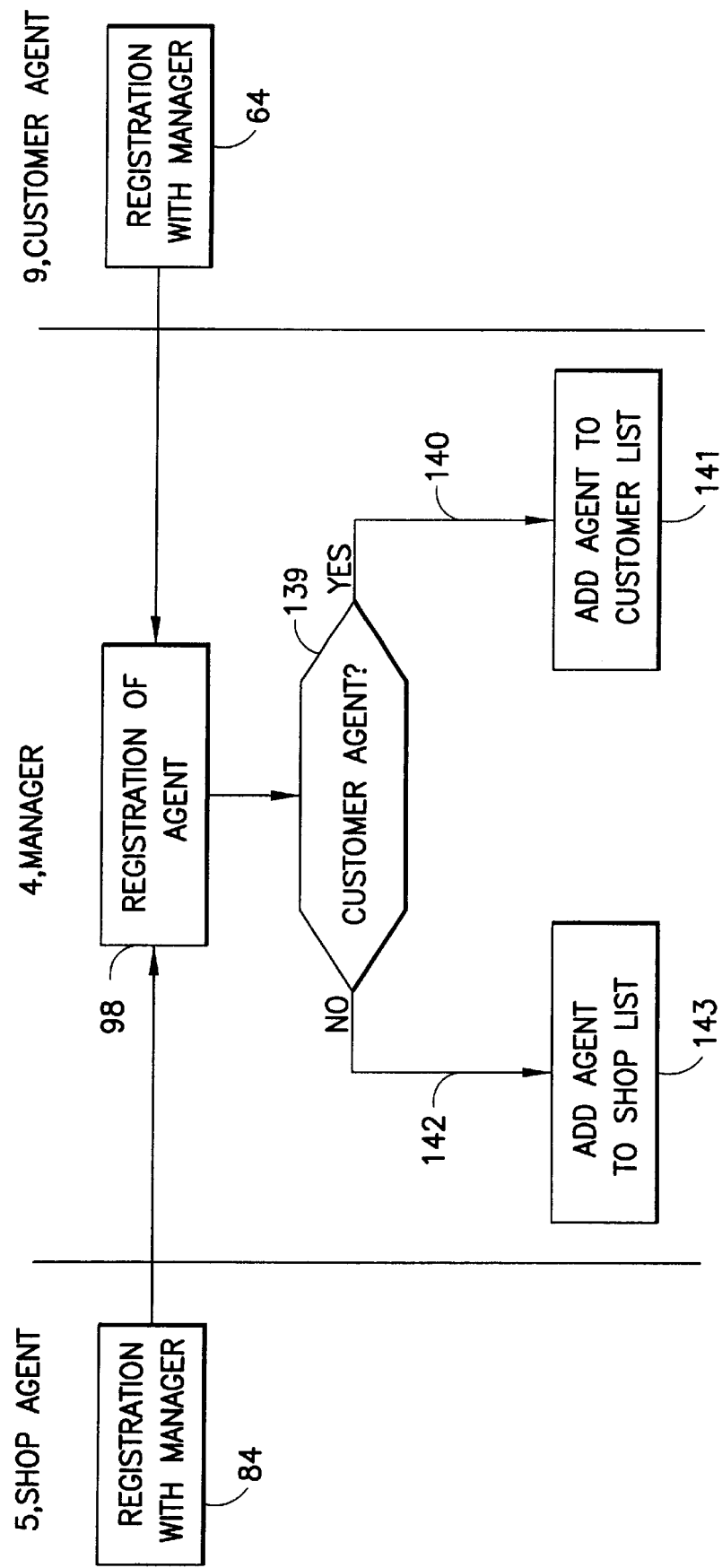
FIG. 14 is a flowchart for processing for registration to the manager agent.

When the customer agent 9 and the shop agent 5 have moved to the virtual mall 1, they are registered with the manager 4, as shown in FIG. 14. The customer agent 9 performs the registration procedure at block 64 relative to the manager 4 (block 25 in FIG. 3). The shop agent 5 performs the registration procedure at block 84 relative to the manager 4 (block 21 in FIG. 3). The respective agents issue a registration request to the manager 4. Upon the reception of the request, the manager 4 calls the registration procedure at block 98. The agent type is evaluated at block 139. When the agent is the customer agent 9 a "YES" or y path 140 is followed and the manager 4 adds the agent to the customer list 94 at block 141. When the agent is a shop agent 5 a "NO" or n path 142 is followed and the manager 4 adds the agent to the shop list 95 at block 143.

Figure 15:
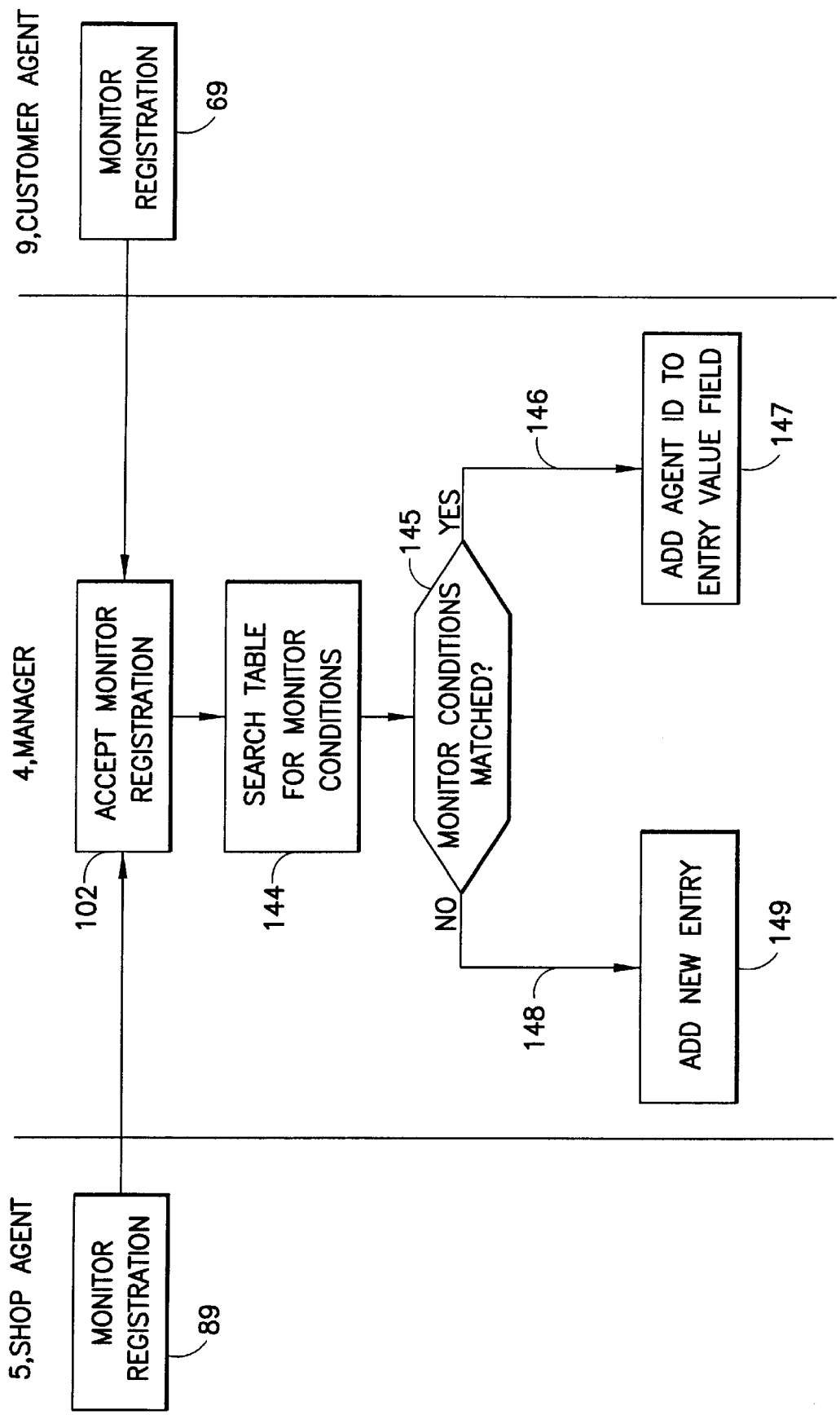
FIG. 15 is a flowchart for the processing to register a monitor condition with the manager agent.

After the shop agent 5 and the Customer agent 9 have been registered with the manager 4, they register a monitor condition in the manner shown in FIG. 15. The shop agent 5 performs the monitor registration procedure at block 89 (block 27 in FIG. 4). The customer agent 9 performs the monitor registration procedure at block 69 (block 34 in FIG. 4), so that registration of the monitor condition with the manager 4 is requested. Upon the reception of the request, the manager 4 performs the monitor registration acceptance procedure at block 102. For this procedure a condition that matches the requested condition is searched for in the monitor condition table 96 at block 144. At block 145 the result of this search is evaluated. If a matching condition is found a "YES" or y path is followed and the agent id is added to the entry value field at block 147. If the same condition is not found a "NO" or N path is followed and a new entry whose key is employed as a monitor condition and whose value is employed as the agent id is generated and added to the monitor condition table 96. It should be noted that the customer agent 9 does not necessarily perform monitor registration. If the monitor registration is performed, however, effective information can be obtained separately.

Figure 16:
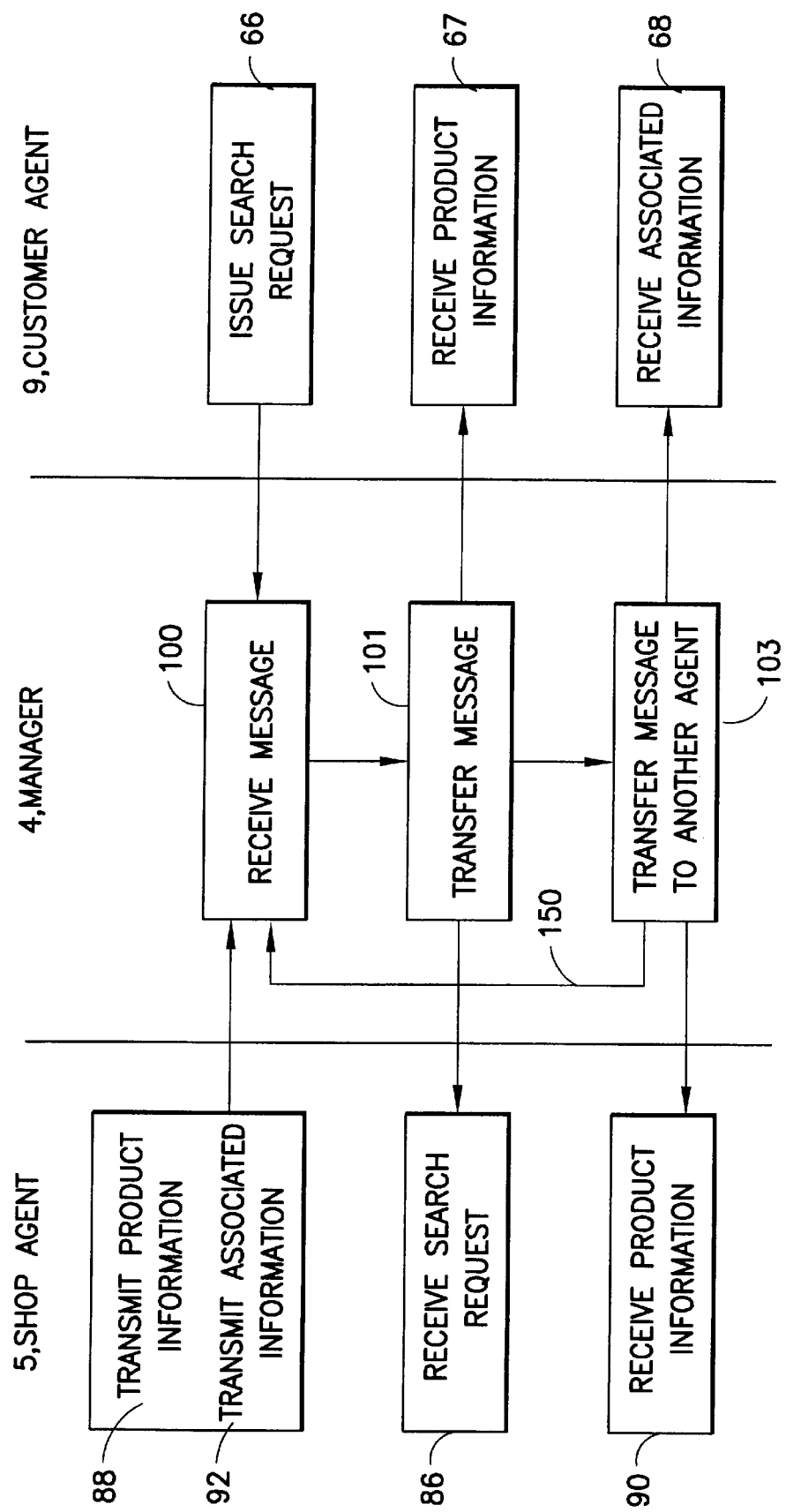
FIG. 16 is a diagram illustrating the transmission of messages between the customer agent, the shop agent and the manager agent.

FIG. 16 is a diagram showing the control of message performed by the manager 4. In a message reception process 100, the manager 4 receives a product information message 88, an associated information message 92 and a search request message 66 (although 88, 92 an d66 are procedures at these respective blocks, the numbers are also used to designate the messages issued by these procedures) from the shop agent 5 and the customer agent 9. In a message transfer process at block 101, the manager 4 extracts the destination agent id included in these messages, and transmits it to the shop agent 5 of the search request reception procedure at block 86, and to the customer agent 9 of the product information reception procedure at block 67 and the associated information reception procedure at block 68. In a message transfer at block 103 to another agent, the monitor condition table is examined for a received message. When the same condition is found, the message is transferred to the shop agent 5 using the product information reception procedure at block 90. The above three processes are repeated as shown by arrow 150.

The flow of messages in FIG. 16 will be specifically explained by using the messages in FIG. 2. First, the customer agent 9 performs the search request issuing procedure at block 66, and transmits the search request 15a to the manager 4. The manager 4 receives the search request 15a during the message reception procedure performed at block 100, and transmits the search request 15b to the shop agent 5 during the message transfer procedure at block 101. In addition, the manager 4 compares the search request 15a with the monitor condition table in the message transfer procedure to block 103 at another agent. Since there is no matching condition, the message is not transferred to another agent. The next message is waited for in the message reception procedure at block 100. The shop agent 5 receives the search request 15b in the search request reception procedure at block 86. By using the product information obtained based on the conditions, the product information transmission procedure at block 88 is executed to transmit the product information service message 16a to the manager 4.

The manager 4 receives the product information service message 16a in the message reception procedure at block 100, and transmits the product information service message 16b to the customer agent 9 in the message transfer procedure at block 101. In addition, the manager 4 compares the product information service message 16c with the monitor condition table in the message transfer procedure at block 103 to another agent. Since a match is obtained for the product information, it is transmitted to the shop agent 17 that requested such monitoring conditions by means of the message transfer procedure at block 103. The shop agent 17 receives the product information transmitted by the product information reception procedure 90, generates associated information, and transmits the associated information service message 18a to the manager 4 using the associated information transmission procedure at block 92. The manager 4 receives the product information service message 18a transmitted by the message reception procedure at block 100, and transmits the associated information service message 18b to the customer agent 9 using the message transfer procedure at block 101. Furthermore, the manager 4 compares the associated information service message 18a with the monitor condition table in the message transfer procedure at block 103 to another agent. Since no match for the associated information service message is obtained here, the manager 4 does not transfer it to another agent and waits for the next message transmitted by the message reception procedure at block 100.

Figures 17, 19:
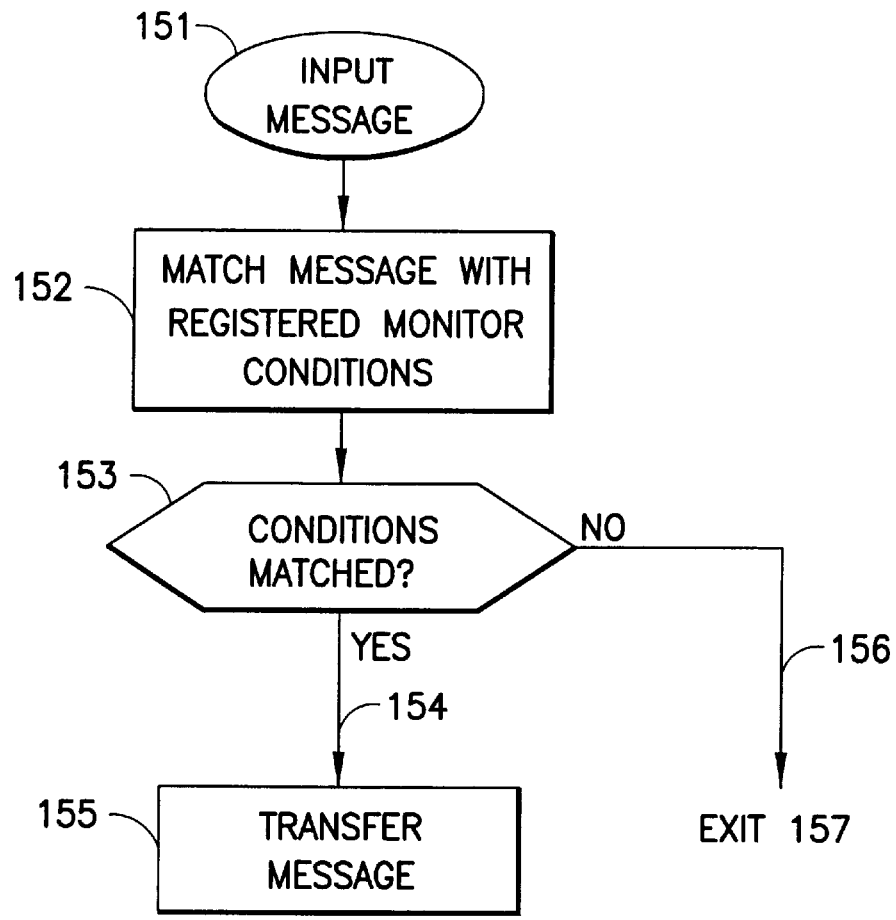
FIG. 17 is a flowchart showing the processing for the transfer of a message from the manager agent to a third agent.
FIG. 19 is a diagram illustrating a description example for an associated product.

FIG. 17 is a detailed flowchart for the message transfer procedure at block 103 used for another agent in FIG. 16. In FIG. 17, an input message 151 is a message received by the manager 4. Upon the reception of the message 151, a procedure is performed at block 152 for matching the message with the monitor condition table 96. At block 153 the result of the procedure performed at block 152 is evaluated. When the message and the contents in the monitor condition table match, a "YES" or Y path 154 is followed and the message is transferred to another agent in the message transfer process at block 155. When the message does not match the contents of the table a "NO" or N path 156 is followed and the processing is terminated without performing any process at exit 157. If, for example, in FIG. 2 the shop agent 17 registers the monitor condition shown in FIG. 11 and the product information service 16a includes a product shown in FIG. 9, the result at the branch 153 is affirmative, "yes", and the Y path 154 is followed and the product information service 16c is transferred to the shop agent 17 at block 155.

Figure 18:
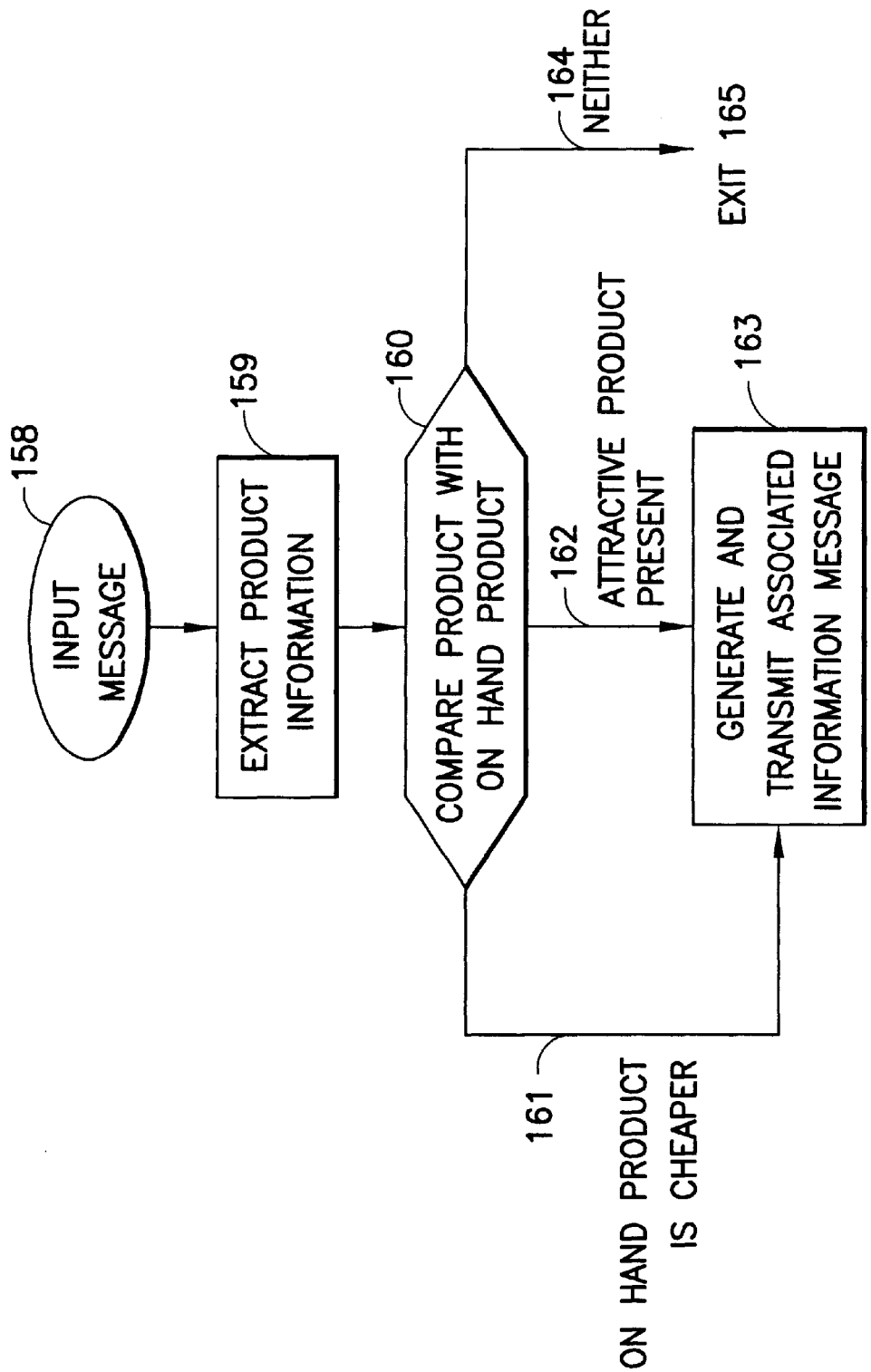
FIG. 18 is a flowchart showing the processing for the generation and transmission of associated information by the shop agent.

FIG. 18 is a flowchart for preparing associated information when the shop agent 17 receives the product information service message 16c. When a message is input at block 158, the product information is extracted from the message at block 159, and is compared with a product on hand at block 160. When the price of the product on hand is lower (path 161) or when an attractive product is listed (path 162), the procedure at block 163 for generating and transmitting a message that concerns associated products is called. When the price of the product on hand is not lower and no attractive product is listed path 164 is followed and the processing is terminated without performing any process at exit 165. The condition where the price of a product is lower or where an attractive product is available can be set for each shop agent. For another condition, such as a case wherein a message includes associated computer products, information concerning the peripheral devices can be defined for transmission.

FIG. 19 is a diagram showing an example description for an associated product. The associated product in FIG. 19 represents a notebook computer that the shop agent 17 has on hand as a competitive product. A CATEGORY= NOTEBOOK field 166 indicates the product category is a notebook computer. A MAKER=IBM field 167 specifies IBM as the maker. A BRAND=ThinkPad field 168 specifies ThinkPad as the brand name (ThinkPad is a trademark of International Business Machines Corp.); A NAME=ThinkPad365X field 169 specifies the product name; A MODEL=2625-Bj9 field 170 specifies the model name; A PRICE=338000 field 171 specifies the price; An ID=#7 field 172 proceeds the product id; CPU=Pentium 150 field 173 identifies the CPU; and a memory=8 field 174 describes the memory size. In FIG. 2, when the product information shown in FIG. 9 is included in the product information service message 16c, the input message 158 in FIG. 18 corresponds to the product information service message 16c, and in a product information procedure 159, the product information shown in FIG. 9 is extracted. In a comparison procedure performed at block 160, the product shown in FIG. 9 is compared with the product on hand shown in FIG. 19. If the product on hand is cheaper, path 161 is followed to the procedure performed at block 163, a message 18a that included the information shown in FIG. 19, can be generated and transmitted.

Figure 20:
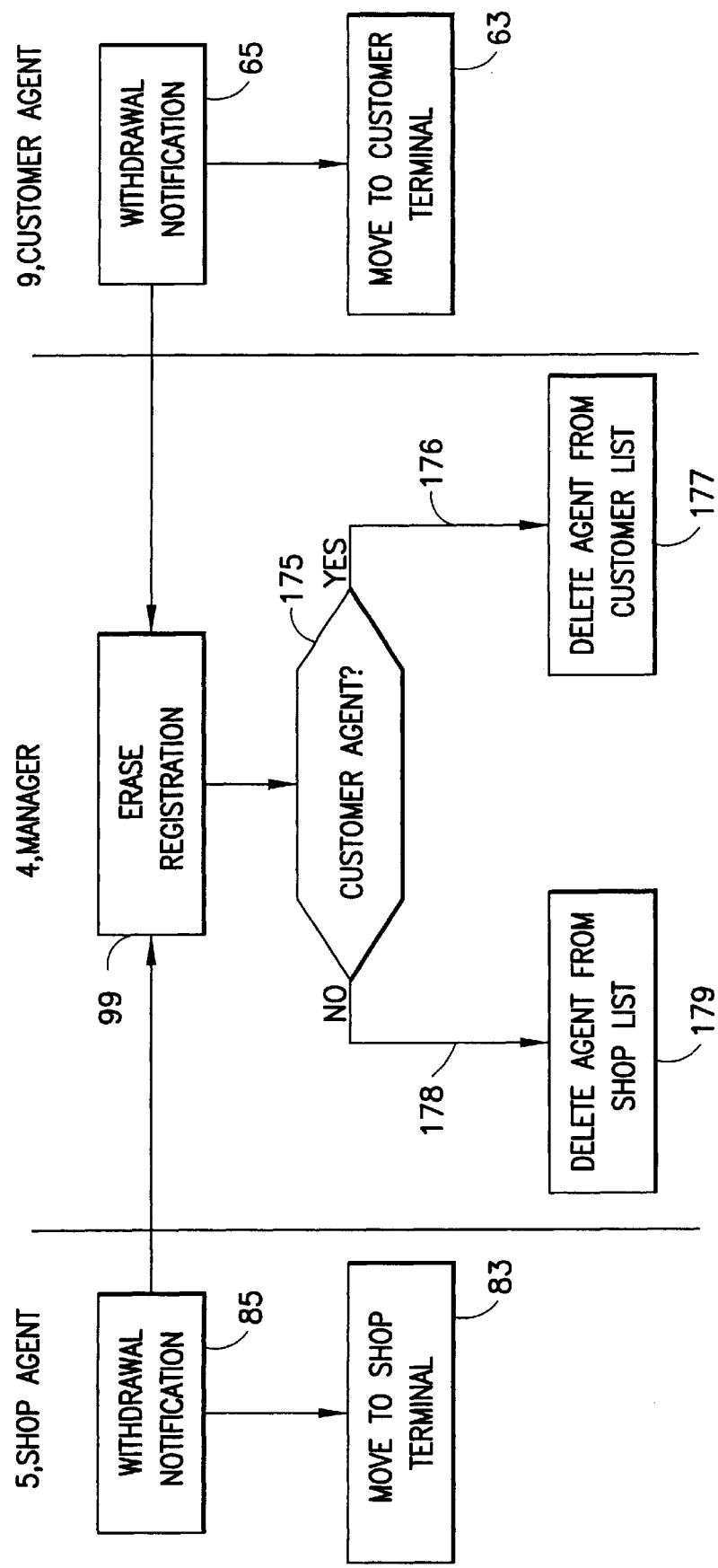
FIG. 20 is a flowchart showing the processing required when the agents withdraw from the virtual mall.

When the computer agent 9 and the shop agent 5 have completed the processing in the virtual mall 1, they return to their respective terminals as is demonstrated in FIG. 20. The customer agent 9 performs a withdrawal notification procedure at block 65, while the shop agent 5 performs a withdrawal notification procedure at block 85. In this way, both agents issue an erasure request to the manager 4. Upon receiving these requests, the manager 4 calls the registration erasure procedure at block 99. At block 175, branch conditions that include, for example the agent type, are evaluated. When the agent is a customer agent a "YES" or Y path 176 is followed and a procedure is performed at block 177 for deleting the agent from the customer list (94). When the agent is a shop agent a "NO" or N path 178 is followed and a procedure at block 179 for deleting the agent from the shop list 95 is performed. When this processing is terminated, the shop agent 5 is returned to the shop terminal 2 by the moving procedure performed at block 83, and the customer agent 9 is returned to the customer terminal 3 by the moving procedure performed at block 63.

Figure 21:
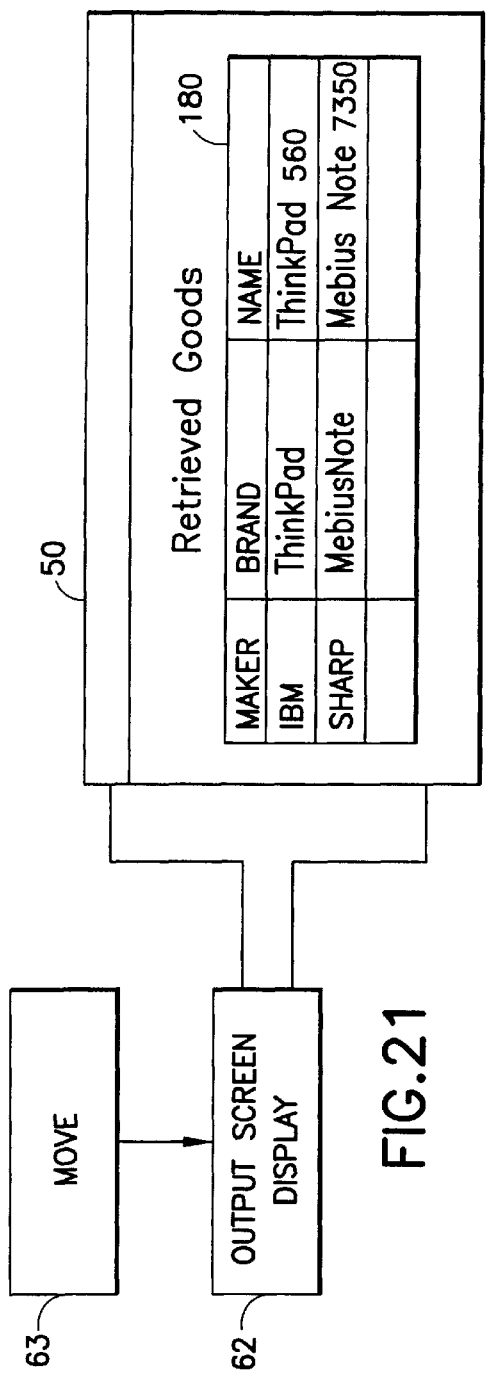
FIG. 21 is a diagram illustrating a result display example for an agent that is returned to the customer terminal.

In FIG. 21, the customer agent 9 moves from the virtual mall 1 to the customer terminal 3 at block 63, and performs the output screen display procedure at block 62. In the search result output screen shown at block 50, the search result is displayed as a table 180, showing that the ThinkPad 560 of IBM Corp. was searched for.

Figure 22:
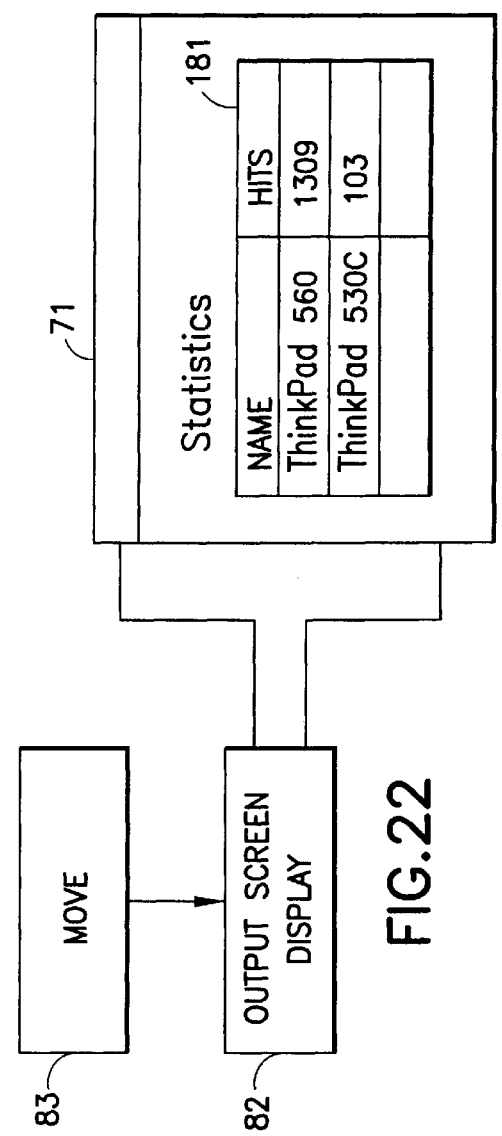
FIG. 22 is a diagram illustrating a result display example for an agent that is returned to the shop terminal.

In FIG. 22, the shop agent 5 moves from the virtual mall 1 to the shop terminal 2 at block 83, and performs the output screen display procedure at block 82. In the statistic information output screen 71, the statistic information is displayed as a table 181, showing that the ThinkPad 560 of IBM Corp. was search for by 1309 times. To display such statistic information, the shop agent 5 must have a counter or must acquire information from another agent having a counter.

The above described embodiment is merely an example, and the present invention is not limited to this embodiment. For example, the virtual mall 1 has been explained as an agent execution environment; however, an interaction between agents can be disclosed by providing a monitor mechanism, i.e., a manager agent in another type of the execution environment to assist the activities of another agent. While an agent which comes to another type of the execution environment does not have the same functions as the customer agent and the shop agent described above, it definitely must have functions related to the monitoring function.

The functions of the customer agent and the shop agent are not limited to those described above, and they may have other functions, such as a negotiation function and a settlement function required for trading.

The procedures in programs included in the agents are not necessarily separated as described in this embodiment, but can be assembled or separated so that programs can have the same functions.

For distribution, the program for providing an execution environment may be stored on a disk drive, on a floppy disk, on a CD-ROM or on another storage medium. For transmission and for storage, the agent may also be stored on a storage medium in the form of a bit sequence.

Although described in the context of preferred embodiments, it should be realized that a number of modifications to these teachings may occur to one skilled in the art.

While the invention has been particularly shown and described with respect to preferred embodiments thereof, it will be understood by those skilled in the art that changes in form and details may be made therein without departing from the scope and spirit of the invention.

What is claimed is:

1. A computer system comprising an execution environment for agents, wherein said execution environment includes a monitor mechanism for intercepting a message transmitted from one of said agents, wherein said monitor mechanism comprises a manager agent having a function for registering a source agent of a monitor registration message and a condition of messages to be transferred to said source agent and transmitted from another agent in response to intercepting the monitor registration message from the source agent which begins its activity within said execution environment, said monitor registration message includes said condition.

2. A computer system according to claim 1, wherein said registering function includes:
   means for determining whether said condition in said monitor registration message is registered in said manager agent; and
   means for storing a source agent so as to correspond to said condition when said condition is registered.

3. A computer system according to claim 1, wherein, in response to the interception of a message transmitted from a sender agent, said transferring function searches for registered conditions by content of said message, and wherein when there exists a condition that matches the content of said message, said transferring function transmits said message to a registering source agent of said condition.

4. A method executed by a manager agent for monitoring a message transmitted from an agent in an execution environment for agents, said execution environment included in a computer system, said method comprising the steps of:
   receiving a monitor registration message from a registering agent, the monitor registration message including a condition of the messages transmitted from another agent and to be transferred to the registering agent, the registering agent beginning its activity on the execution environment;
   in response to receiving the monitor registration message, registering the registering agent and the condition included in the monitor registration message;
   intercepting a message transmitted from a sender agent;
   searching for a registered condition by using contents of said message, and if there is a registered condition matched with said contents of said message, transmitting said message to the registering agent that registered said matched condition; and transmitting said message to a receiver agent of said message.

5. A method as set forth in claim 4, wherein the registering step further includes the steps of:
   determining whether the condition in the monitor registration message is registered in the manager agent; and
   if the condition is register, storing the registering agent in correspondence with the condition.

6. A storage medium storing a program for monitoring a message from an agent in a computer system including an execution environment for agents, said program enabling said computer system to perform the steps of:
   receiving a monitor registration message from a registering agent, said monitor registration message including a condition of messages transmitted from another agent and to be transmitted to the registering agent, said registering agent beginning its activity on said execution environment of said agents;
   in response to receiving said monitor registration message, registering said registering agent and said message condition included in said monitor registration message;
   intercepting a message from a specific agent;
   searching for a registered condition by using contents of said message, and if there is a registered condition matched with said contents of said message, transmitting said message to the registering agent that registered said matched condition; and
   transmitting said message to a destination agent of said message.

7. A storage medium as set forth in claim 6, wherein said registering step further includes the steps of:
   determining whether said condition in said monitor registration message is registered in said manager agent; and
   when said condition is registered, storing said registering agent in correspondence with said condition.

* * * * *